T. J. DALE.
Sash-Balances.

No. 163,920.  Patented June 1, 1875.

Witnesses
Theodore Munson
Geo. H. Given

Inventor
Thomas J. Dale,
By J. W. Golladay
His Atty

UNITED STATES PATENT OFFICE.

THOMAS I. DALE, OF RUSSELLVILLE, KENTUCKY.

IMPROVEMENT IN SASH-BALANCES.

Specification forming part of Letters Patent No. 163,920, dated June 1, 1875; application filed April 19, 1875.

*To all whom it may concern:*

Be it known that I, THOMAS I. DALE, of Russellville, in the county of Logan and State of Kentucky, have invented a new and useful Improvement in Sash-Balances; and I hereby declare the following to be a full, clear, and exact description of the same, reference being had to the accompanying drawing of same, making a part of this specification, in which—

Figure 1:
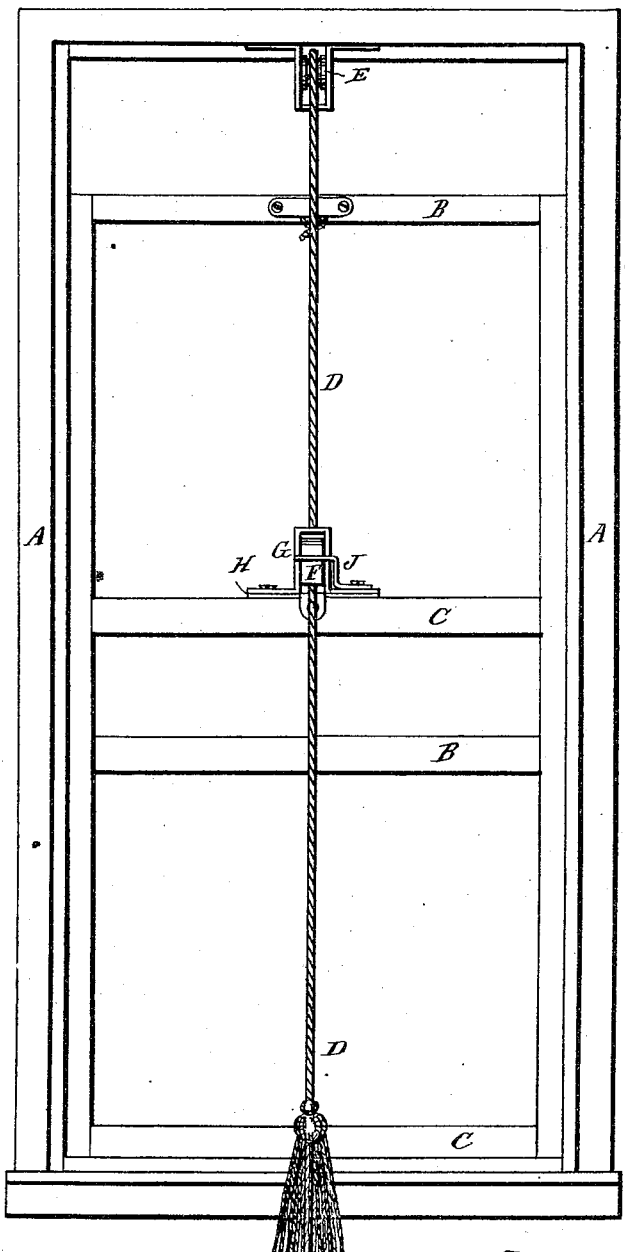
Figure 2:
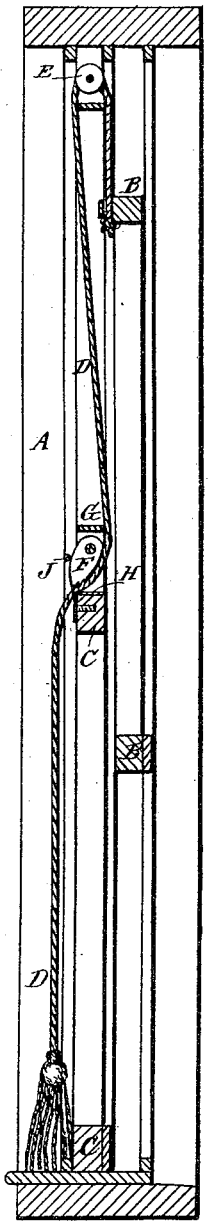
Figure 3:
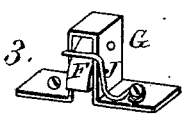

Figure 1 is a front elevation of device embodying the improvements in my invention. Fig. 2 is a transverse sectional view of Fig. 1, and Fig. 3 is a perspective view of the invention.

This invention relates to an improvement in that class of sash-balances in which a cord fastened to the top of the upper sash passes over a pulley depending from the top of the window-casing and is clamped by a dog secured to the top of the lower sash, and it consists in providing the dog with a pivoted clasp, which may be turned to clasp either the upper or lower edge of the dog, for the purposes of insuring the bite of the dog upon the cord, and also of holding the nose of the dog up from the cord when desired, as will hereinafter more fully appear.

In the accompanying drawing, A is the window-casing. B is the upper and C the lower sash. D is a cord secured to the upper cross-piece of the upper window-sash, quite near the glass. E is a pulley, depending from the lower side of the top of the window-frame A. The wedge-shaped dog F is supported by bearing in the sides of the metallic case G, which latter is secured over a plate, H, to the top of the lower sash C. A pivoted clasp, J, is secured, at one side of the case G, to the top of the lower sash C by one of the screws that secures the case G, so that it may be turned to clasp the upper edge of the wedge-shaped dog F, when the latter is turned down upon the cord D, or to clasp the lower or serrated edge of the dog F, when the latter is turned up in the case G.

The operation of the invention is as follows: The pressure of the clasp J upon the dog F, and the weight of the sash upon the cord, press the dog against the cord and prevent it from slipping. To lower the upper sash, take hold of the cord and raise the dog slightly, when the weight of the sash will draw the cord through the case. When the sash has been lowered the required distance, release the dog and it will at once clamp the cord, and sustain the sash in the position to which it has been lowered. To raise the lower sash when the upper sash has been lowered, it is only necessary to push it up, when the upper sash will descend a distance equal to the distance that the lower sash has been elevated. To raise the lower sash when the upper one is at the top of the casing, pull upon the cord and raise the sash with the hand. To lower either or both of the sashes to the bottom, turn the clasp J away from the front of the case G and turn the dog F up, and if desired turn the clasp J back to hold the dog up. The dog will not then bite upon the cord, and it can slip freely through the case G.

Having thus described my invention, what I claim as new and useful, and desire to secure by Letters Patent, is—

The pivoted clasp J, in combination with the dog F, suppported in bearings in the metallic case G, substantially as and for the purposes set forth.

In testimony that I claim the foregoing improvements, as above described, I have hereunto affixed my hand this 10th day of April, 1875.

THOMAS I. DALE.

Witnesses:
 J. W. LEDMAN,
 CHAS. N. SMITH.